G. C. WILLIAMS.
DRAFT TREE.
APPLICATION FILED MAY 31, 1918.
1,288,783.
Patented Dec. 24, 1918.
2 SHEETS—SHEET 1.
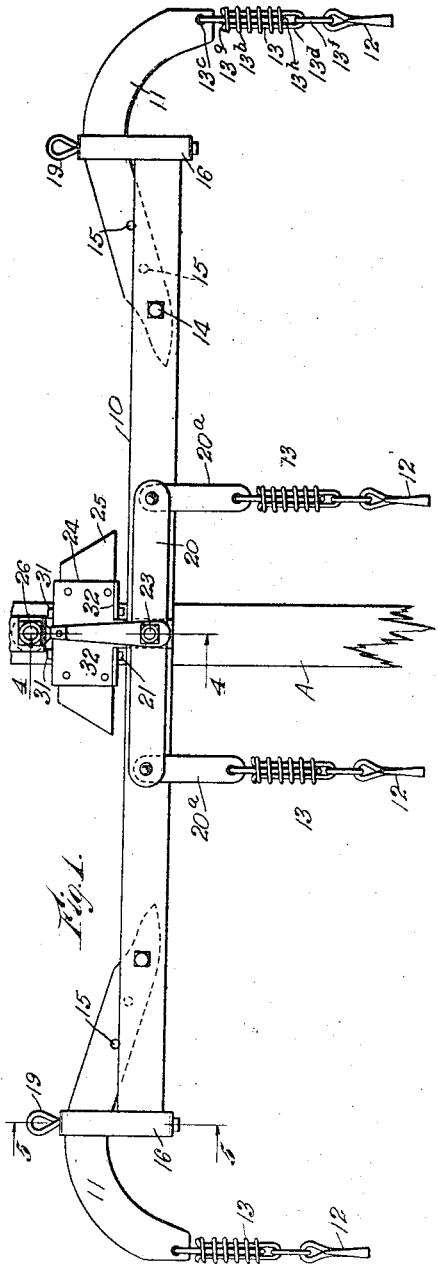
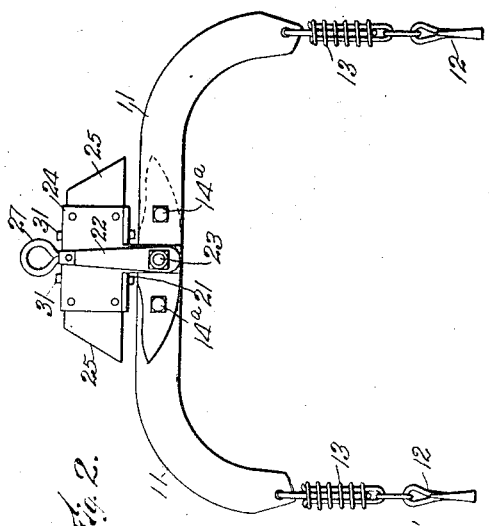
WITNESSES
INVENTOR
Gabriel C. Williams
BY
ATTORNEYS

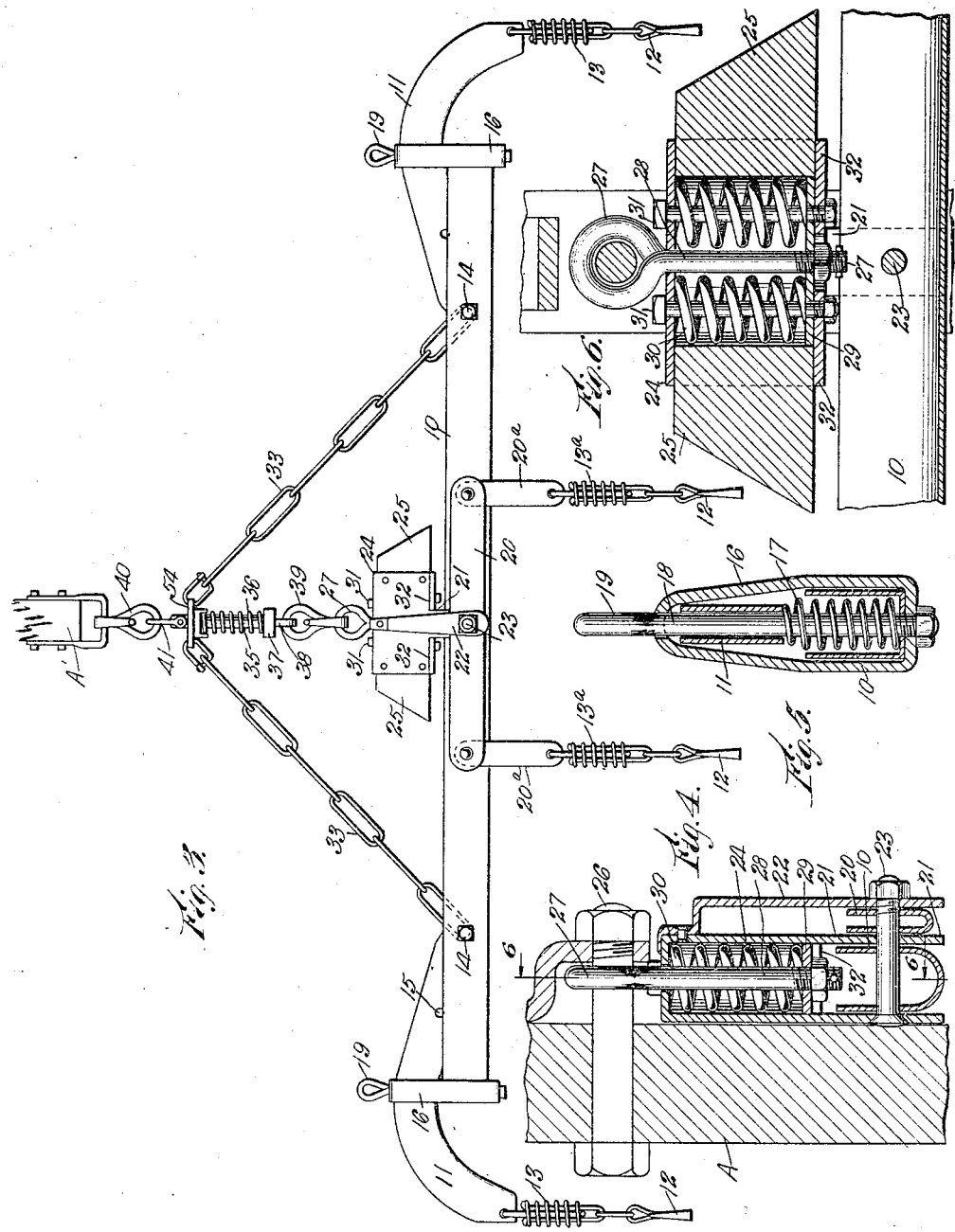

UNITED STATES PATENT OFFICE.

GABRIEL C. WILLIAMS, OF BROOKHAVEN, MISSISSIPPI.

DRAFT-TREE.

1,288,783.  Specification of Letters Patent.  Patented Dec. 24, 1918.

Application filed May 31, 1918. Serial No. 237,477.

*To all whom it may concern:*

Be it known that I, GABRIEL CLARK WILLIAMS, a citizen of the United States, and a resident of Brookhaven, in the county of Lincoln and State of Mississippi, have invented a new and Improved Draft-Tree, of which the following is a description.

My invention relates to draft devices, and more particularly to a device embodying elements adapted to constitute a doubletree and certain of which elements are adapted to be directly connected up for forming a swingletree, important objects being to facilitate the changing from a swingletree to a doubletree, and to provide for the absorption of shocks to the draft animals in starting with a load or in pulling a heavy load over uneven ground.

The nature of the invention and its advantages will more clearly appear from the brief description following.

Reference is to be had to the accompanying drawings forming a part of this specification, it being understood that the drawings are merely illustrative of one example of the invention.

Figure 1 is a plan view of a doubletree embodying my invention;

Fig. 2 is a similar view of certain elements of Fig. 1 united into a swingletree;

Fig. 3 is a plan view of the elements shown in Fig. 1 and additional elements, the whole being adapted for use on road graders and road slips, or for employment on the front end of a tongue for hitching an additional team;

Fig. 4 is an enlarged vertical section on the line 4—4, Fig. 1;

Fig. 5 is an enlarged vertical section on the line 5—5, Fig. 1;

Fig. 6 is a sectional view on the line 6—6, Fig. 4, the tongue being omitted.

In providing a combination of elements to carry out my invention, an evener bar 10 is provided and separate arms 11 are adapted to be connected at the ends of the evener bar or directly connected as hereinafter explained. Each arm 11 carries suitable means to connect with an outside trace 12 by a spring connection 13, hereinafter more particularly referred to. In the case of the doubletree as indicated in Figs. 1 and 3, each arm 11 is secured at its inner end to the evener 10 by a transverse bolt 14, and a plurality of bolt holes 15 are provided in said inner end of each arm to receive additional bolts in forming a swingletree as in Fig. 2 and as later described. Between its ends, each arm 11 extends through a keeper 16 on the evener 10 as shown best in Fig. 5, and the said bar within the keeper rests upon a compression spring 17 coiled about a pin 18 extending lengthwise through said keeper and transversely through the evener 10. Thus, a pull on the outer trace 12 is cushioned by said spring 17.

At the center of the evener 10 a short equalizer bar 20 is pivoted, said bar 20 being secured within a strap 22 riveted at its upper end to a shackle 21, the securing bolt 23 passing through the opposite sides of the shackle 21, through the bar 10, equalizer 20, and strap 22 as clearly shown in Fig. 4. The said evener 10 and equalizer 20 are U-shaped in cross section. The shackle 21 is broadened except at its extreme ends, constituting a U-shaped housing 24, the ends of which may be closed by wood blocks 25. The shackle 21 may be pivotally secured to the tongue A, Figs. 1 and 4, by suitable means including a transverse bolt 26 which extends through the eye 27 on a pin 28, which pin, within the housing 24, receives a plate or bar washer 29 on which springs 30 seat, said springs being coiled about bolts 31 extending through the rear end or bend of the housing 24 and through said plate 29 as well as through additional plates 32 directly adjacent to said plates 29, so that said bolts 31 are rigid with the shackle. Thus, the evener 10 is pivoted by the bolt 26 while the central equalizer 20 is pivoted by the bolt 23, said evener having also a limited pivotal movement on the pin 23 and relatively to the shackle. The equalizer 20 has at the ends thereof suitable means to connect with the inner traces 12, there being shown links 20ª pivoted to the outer ends of said equalizer and these in turn connecting with the adjacent traces 12 through spring means 13ª corresponding with the elements 13. Thus, the draft exerted on the evener 10 at the pin 28 will be exerted indirectly on said pin through the springs 30, thereby cushioning the connection.

When hitching to a road scraper or the like, or when connecting an additional team to the front of a tongue A', the evener 10 is provided with chains 33, the forward ends of which are secured by the bolts 14, (see Fig. 3), and the rear ends of said chains are convergent and suitably secured to opposite sides of a collar 54 loose on a pin 35 surrounding which is a spring 36 abutting at one end against the collar 54 and at the forward end against a flange or collar 37 on an eye 38 which is suitably connected with the eye 27 of pin 28 through the medium for example of a snap-hook 39. Connection between the rear end of the pin 35 and the front end of the tongue A' is effected in any suitable manner as through the medium of a snaphook 40 and shackle 41.

Referring to Fig. 2, it will be seen that a swingletree is formed by bolting the arms 11 directly together for which purpose the arms are overlapped so that the central hole 15 (see Fig. 1) in the respective arms 11 will register to receive the bolt 23 previously referred to, the bolt holes at opposite sides of the bolt 23 receiving bolts 14ª. Thus, the arms 11 are held rigidly together to form a swingletree and are connected by the bolt 23 with the shackle 21 and its described spring appurtenances, said swingletree carrying the traces 12 connected by the spring elements 13.

Each spring connection 13 includes a spring 13ᵇ coiled about telescoping members connected respectively with the arms 11 and with the adjacent traces, there being shown (see the right of Fig. 1) a central link 13ᶜ pivotally secured to the end of the arm 11 and a U-shaped element 13ᵈ connected with the trace 12 through a link 13ᶠ or the like. The respective ends 13ᵉ, 13ᵍ of the members 13ᶜ, 13ᵈ, are turned over to engage the opposite ends of the spring 13ᵇ.

It will thus be seen that in addition to the cushioning by the trace connections 13, there is a cushioning at the central connection of the evener bar 10 by the springs 30 and there is a cushioning for the additional chains 33 through the medium of the springs 36 when said chains are employed.

It will be seen also that the outer traces connect with the evener bar 10 at the ends through the arms 11 while the inner traces of the two horses connect with the equalizer bar 20.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A doubletree including an evener bar, arms at the ends thereof and pivoted at their inner ends thereto, said arms being U-shaped in cross section, keepers on the said bar and extending rearwardly therefrom through which keepers the arms pass freely, springs in said keepers forming cushions for the arms, bolts on which said springs are coiled, said bolts ranging lengthwise in the keepers and passing through said arms and evener bar, means to connect the outer ends of said arms with the outer traces of a team, and means at the approximate center of the evener bar to connect with the respective inner traces of the team.

2. A doubletree including an evener bar, a shackle through the front end of which the evener bar passes transversely, a strap on the shackle on a face thereof, a short equalizer bar between the strap and the adjacent face of the shackle, a bolt extending through the shackle, evener, strap, and equalizer bar, a pin extending at its front end into said shackle and having an eye at its rear end adapted to receive a bolt to secure the pin to a tongue or implement to be drawn, springs in said shackle, a plate in the shackle, and forming a seat for the front ends of the springs, said pin at the front end passing through said seat, a nut on said bolt and receiving the pressure of the springs against said seat, bolts passing through the shackle and about which the springs are coiled; plates on the front of the shackle and through which the last mentioned bolts are passed, and nuts on the latter bolts and bearing against said last mentioned plates.

3. A draft tree including an evener bar, and means to form a cushion connection between said bar and a tongue or implement to be drawn, said means including chains connected at their forward ends with the evener bar at opposite sides of the center of the latter, the rear ends of the chains converging, a collar to which the rear ends of the chains are connected, a pin on which said collar is loose, a spring bearing at its rear end against the collar and at its front end against the said pin, means to connect the forward end of said pin with the evener bar, and means to connect the rear end of the pin with the tongue or implement to be drawn.

GABRIEL C. WILLIAMS.

Copies of this patent may be obtained for five cents each, by addressing the "Commissioner of Patents, Washington, D. C."